United States Patent [19]

Kaneko et al.

[11] 4,306,176

[45] Dec. 15, 1981

[54] OPERATION INDICATOR FOR AUTOMATIC FLASH DEVICE

[75] Inventors: Yoshikazu Kaneko, Shijyonawate; Shinichiro Nakanishi, Higashi-Osaka, both of Japan

[73] Assignee: West Electric Company, Ltd., Osaka, Japan

[21] Appl. No.: 38,227

[22] Filed: May 11, 1979

[30] Foreign Application Priority Data

May 18, 1978 [JP] Japan .......................... 53/67265[U]

[51] Int. Cl.³ .......................... G03B 7/16; G08B 7/06
[52] U.S. Cl. ........................... 315/133; 354/33; 354/60 L; 315/151; 315/134; 340/660
[58] Field of Search ............... 354/33, 60 L, 60 E, 354/128, 145, 149; 315/133, 241 P, 151, 134; 340/659, 660

[56] References Cited

U.S. PATENT DOCUMENTS 3,778,672 12/1973 Fountain ............................. 315/133
4,100,459 7/1978 Nakamura ...................... 315/241 P Primary Examiner—L. T. Hix
Assistant Examiner—Stafford D. Schreyer
Attorney, Agent, or Firm—Cushman, Darby & Cushman

[57] ABSTRACT

An operation indicator for an automatic flashing device comprising a first indication means which visually indicates a reaching to a predetermined voltage of main capacitor and readiness for proper completion of flashing of an automatic light adjusting, and a second indication means which indicates a selected one of them by sound, and a switching means which connects or disconnects said second indication means to the circuit of the device.

By the abovementioned construction, the user can realize readiness of automatic flash operation both by eyesight and by audition.

6 Claims, 3 Drawing Figures

OPERATION INDICATOR FOR AUTOMATIC FLASH DEVICE

BACKGROUND OF THE INVENTION

1. Field of the Invention

This invention relates to an improvement in an operation indicator for an automatic flash device. It is more particularly directed to the indication means of the operation.

2. Description of the Prior Art

For operation indicator to indicate readiness for automatic flashing, for indication of achieving a substantially full charged voltage of the main capacitor or an operation of the automatic adjusting of light quantity, it has been known to use a neon tube or a light emitting diode (LED).

However, in the abovementioned conventional indicator, a photographer has to observe the readiness by moving his eye from the view-finder to the indicator. Accordingly, due to such eye moving, there is a possibility of losing an important chance of photographing.

It is already known, in order to solve such a problem, to provide an apparatus for indication of the charged voltage of the main capacitor with an indicating device which can indicate by sound when the predetermined voltage of the main capacitor capable of making the flash discharge tube flash is reached. An art similar to this is applicable to the indication of automatic light adjusting operation.

Therefore the abovementioned problem can be solved by indication apparatus which is based on and utilizes the visual sense and the auditory sense.

However the abovementioned device simply having sound indication, namely the indication apparatus utilizing the auditory sense, issues a sound continuously, for example, after a predetermined voltage of the main capacitor is reached. Accordingly, sound for indication may be inappropriate in some environments, or sometimes missed by photographer in a noisy environment.

SUMMARY OF THE INVENTION

The present invention solves the above-mentioned various problems by providing an operation indicator for automatic flash device having both a first indication means which visually indicates the charging to a predetermined voltage of a main capacitor and a completion of an automatic light adjusting, and a second indication means which indicates a selected one of these conditions by sound i.e. the auditory sense. The second indication means can be switched and disconnected from the first indication means, indication means and power with one knob.

DETAILED DESCRIPTION OF PREFERRED EMBODIMENT

An automatic flash device of the present invention comprises a first indication means which indicates the charging to a predetermined charged voltage of main capacitor and also a readiness of proper completion of an automatic light adjusting by eyesight, and a second indication means which indicates these conditions by sound. The second indication means is optionally added to the first indication means by a switch.

Therefore the photographer can observe these conditions by the sound indication while looking through a view finder.

Figure 1:
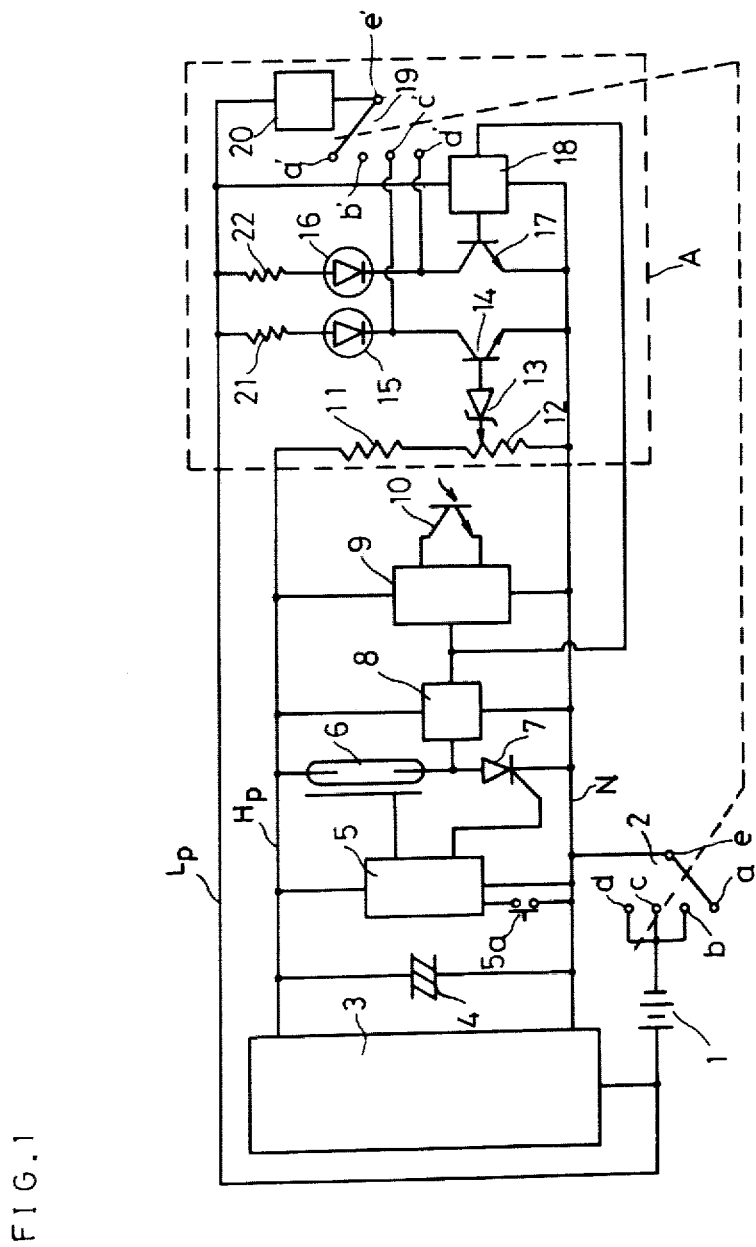
FIG. 1 is an electric circuit of the automatic flash device provided with an operation indicator in accordance with the present invention.

FIG. 1 shows an electric circuit of an automatic flash device of the present invention providing an alarm circuit A. This device has a D C electric power source 1, a power switch 2 connected in series, a DC-DC converter 3 which is fed by the power source 1 through the power switch 2 and positive lower voltage line $L_p$ and negative line N, a main capacitor 4 which is connected across the output positive higher voltage line $H_p$ and negative line N, a known trigger circuit 5 for triggering a flash discharge tube 6 and a thyristor 7 connected in series to the flash discharge tube 6 to form a so called series type automatic flash device, a photoelectric transducing device 10, for example a phototransistor, a light receiving circuit 9 which intergrates the signal from the photoelectric transducing device 10 from the time of start of the flashing, a thyristor turn-off control circuit 8 which controlles the thyristor 7 to turn off, and an alarm circuit A. The alarm circuit A has a resistor 11 and a variable resistor 12 connected in series across both ends of the main capacitor 4, a first series circuit consisting of a resistor 21, a light emitting diode (LED) 15, a transistor 14 and a second series circuit consisting of a resistor 22, a LED 16, a transistor 17. The alarm circuit A also includes a zener diode 13 connected between a movable contact of the variable resistor 12 and the base electrode of the transistor 14, and a timer circuit 18. An alarm sound producing circuit 20 is connected between the positive end of the power source and a moving arm of a selection switch 19. The contact c' and d' of the selection switch 19 is connected to the collectors of the transistors 14 and 17, respectively. The timer circuit 18 is connected by its input terminal to an output terminal of the light receiving circuit 9, and the output terminal of the former is connected to the base electrode of the transistor 17. The selection switch 19 is for controlling a connection of the alarm sound prdoducing circuit 20, and is linked to the power switch 2. Namely the movable contacts e and e' of these switches 2 and 19 are connected to the stationary contacts a to d and a' to d' of the switches 2 and 19, respectively. The dividing ratio of the resistors 11, 12 determines a specified voltage A synchronous switch 5a, for example, of a camera, is connected to the trigger circuit 5, output terminals of which are connected to the triggering electrode of the flash discharge tube 6 and the gate electrode of the thyristor 7.

OPERATION

(1) OFF state

In the state of switches shown in FIG. 1, namely with the movable contact e and e' of the switches 2 and 19 being connected to the stationaly contact a and a' thereof respectively, voltage of the power source 1 is not supplied to the DC-DC converter 3 and then the series type automatic flash device is not operable.

(2) Visual indicating state (when switches 2, 19 are on contacts b and b')

When the movable contact e of the power switch 2 is changed to contact the stationary contact b, at the same time, the movable contact e' of the switch 19 is also changed to connect the stationary contact b'. By this shifting, the voltage of the power source is fed to the DC-DC converter 3, and then the main capacitor 4 is charged by the output voltage of the DC-DC converter 3. When the main capacitor 4 charges to such predetermined voltage that the flash discharge tube 6 can flash, the divided voltage at the moving contact of the variable resistor 12 rises and the zener diode 13 breaks down to a conductive state. By the conduction of the zener diode 13, a base current of the transistor 14 is fed from the DC-DC converter 3 through the zener diode 13, and thereby makes the transistor 14 turn on. Therefore, a closed loop consisting of the electric power source 1, the LED 15, the transistor 14, the resistor 21, and the stationary contact b of the power switch 2 is completed and the LED 15 is lighted to indicate that "the charged voltage of the main capacitor 4 reaches the predetermined voltage".

Detection of the charged voltage of the main capacitor 4 can be made not only by the use the zener diode 13 but also by a use of a detecting means consisting of resistors only, or further, we may use any other known switching device.

Under the abovementioned state, when the synchronous switch 5a is closed, the trigger circuit 5 sends triggering signals to the flash discharge tube 6 and the gate electrode of the thyristor 7, resulting in that the flash discharge tube 6 flashes by the electric charge of the main capacitor 4. The photoelectric transducing device 10 receives the light reflected by the photographic object, and when the integrated amount of received light reaches the predetermined quantity, the light receiving circuit 9 sends signals to the turn-off circuit 8 and the timer circuit 18. The turn-off circuit 8 applies a reverse bias voltage across the anode and the cathode electrode of the thyristor 7, and makes the thyristor 7 turn off. Then the flash discharge tube 6 stops flashing, and automatic flashing is accomplished. And also by the output signal of the light receiving circuit 9, the timer circuit 18 sends a signal to the base electrode of the transistor 17 and makes it turn on for a predetermined time period. Therefore, for that time period, the LED 16 illuminates and indicates the completion of the automatic flashing, since the illumination of the LED 16 occurs upon the operation of the turn-off circuit 8.

The timer circuit 18 may instead have the output terminal of the turn-off circuit 8 connected to the input terminal thereof.

Figure 2:
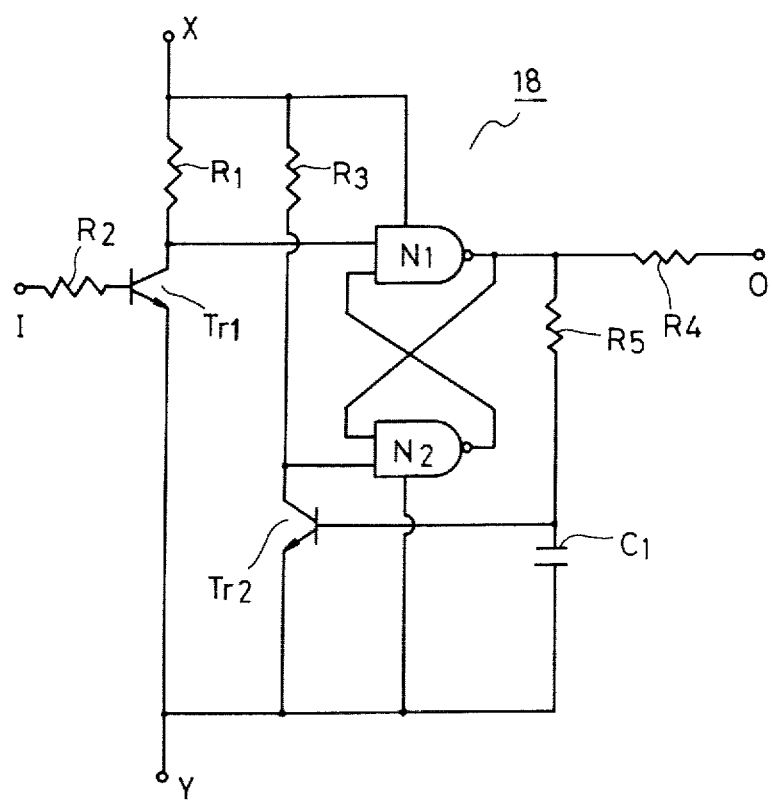
FIG. 2 is an electric circuit of an embodiment of a timer circuit indicated by reference numeral 18 of FIG. 1.

One embodiment of the timer circuit 18 which holds the transistor 17 in the ON state during a predetermined time period, is illustrated in FIG. 2. The embodiment of the timer circuit 18 has two NAND gates $N_1$, $N_2$, output terminals of which are connected to input terminals of the other NAND gates $N_1$, $N_2$ respectively, and two transistors $Tr_1$, $Tr_2$. The transistors $Tr_1$ and $Tr_2$ are connected by their collectors through resistors $R_1$ and $R_3$, respectively, to the positive terminal X and by their emitters to the negative terminal Y. The base of the transistor $Tr_1$ is connected through a resistor $R_2$ to the input terminal I. The output terminal of the NAND gate $N_1$ is connected to the output terminal O through a resistor $R_4$ and also connected to the terminal Y through a series connection of a resistor $R_5$ and capacitor $C_1$. The base electrode of the transistor $Tr_2$ is connected to the junction point between the resistor $R_5$ and the capacitor $C_1$.

The operation of this timer circuit 18 is as follows: When the power switch 2 is turned ON, power is applied to the timer circuit 18. In case the output signal of the light receiving circuit 9 is not fed to the timer circuit 18, these two NAND gates $N_1$ and $N_2$ are held to have their output level "L" and "H". In that state, when an input signal of "H" level signal is fed to the input terminal I of the timer circuit 18, the transistor $Tr_1$ turns on, and hence a "L" level signal is fed to one of the input of the NAND gate $N_1$ from the collector of the transistor $Tr_1$. Therefore the output level of the NAND gate $N_1$ turns from "L" to "H", and the output level of the NAND gate $N_2$ is inverted from "H" to "L" by means of a level inversion of the NAND gate $N_1$. After the level inversion, the capacitor $C_1$ is charged by a current flowing through the resistor $R_5$ and the base voltage of the transistor $Tr_2$ rises up gradually. When the voltage reaches a specified voltage, the transistor $Tr_2$ turns on and feeds "L" level signal to one of the input terminal of the NAND gate $N_2$. By such an operation, the output level of the NAND gate $N_2$ turns from "L" to "H" and that of the NAND gate $N_1$ is turned to "L" again.

Then, let's elucidate with respect to the output level state of the NAND gate $N_1$ in these two NAND gates operation of $N_1$ and $N_2$. "L" level of the NAND gate $N_1$ is kept until supplied with the signal from the light receiving circuit 9. Then, after receiving the signal from the light receiving circuit 9 the output level turns to "H" from "L" by the input supply, and again turns to "L" from "H" after the turning on of the transistor $Tr_2$. In conclusion, the level of the NAND gate $N_1$ is "H" during the time period from the impressing of the input signal to the turning on of the transistor $Tr_2$, namely the time period determined by the time constant of the resistor $R_5$ and the capacitor $C_1$.

Accordingly, by supplying the output signal of the NAND gate $N_1$ from the output terminal 0 of FIG. 2 to the base electrode of transistor 17 of FIG. 1, the transistor 17 can be kept in a conductive state during the time period decided by the resistor $R_5$ and the capacitor $C_1$.

The timer circuit 18 of FIG. 1 is a circuit which starts time counting by the input signal of the light receiving circuit 9 and supplies the a square wave output signal of a predetermined length of time.

(3) Auditory indicating state of charging (when switches 2, 19 are on contacts c and c'

The operation when the movable contact e of the power switch 2 is thrown to the stationary contact c is as follows: By means of the interlocking, the movable contact e' of the selection switch 19 is also changed to contact the stationary contact c'. Also in this state the voltage of the power source is fed to the DC-DC converter 3, and therefore, the main capacitor 4 is charged. When reaching a predetermined voltage capable of the flashing of the flash discharge tube 6, the zener diode 13 changes to on state and the transistor 14 turns on, resulting in that the LED 15 illuminates and indicates the reaching to that level of the charged voltage of the main capacitor 4. Simultaneously the alarm sound producing circuit 20 issues a sound when the transistor 14 turns on for the alarm sound producing circuit 20 is connected to the electric power source 1 through the transistor 14 and the power switch 2.

Namely in case the movable contact e of power switch 2 is connected to the stationary contact c, when the charged voltage of the main capacitor 4 reaches a predetermined voltage, the photographer can recognize readiness for a flashing by audition as well as by eyesight because both the LED 15 illuminates and the alarm sound producing circuit 20 produces an alarm sound.

When the synchronous switch 5a is closed, the flash discharge tube 6 flashes, and hence the photoelectric transducing device 10 receives the light reflected from the object similarly as the aforementioned operation. When the amount of received light reaches a predetermined quantity, the output signal of the light receiving circuit 9 is sent to the turn-off circuit 8 thereby making the flash discharge tube 6 stop flashing, and simultaneously, the timer circuit 18 produces a square wave pulse thereby illuminating the LED 16. In this manner, the automatic flashing and the indication of a completion of proper automatic flashing and the indication of a completion of proper automatic flashing by the LED 16 is accomplished.

Figure 3:
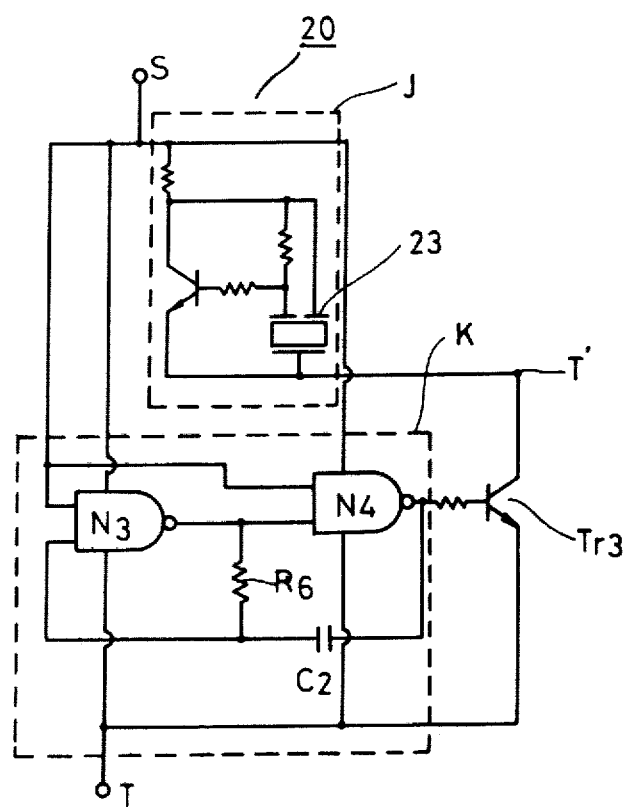
FIG. 3 is an electric circuit of an embodiment of an alarm sound producing circuit indicated by reference numeral 20 of FIG. 1.

One embodiment of the alarm sound producing circuit 20 is shown in FIG. 3 and explained below. As illustrated in FIG. 3, the embodiment has a sound producing part J having an oscillating element 23, e.g. a crystal oscillator, and an oscillating circuit K having two NAND gates $N_3$, $N_4$, a resistor $R_6$, and a capacitor $C_2$. The sound producing part J produces sound when the voltage of the power source is applied across the positive and intermediate terminals S and T'. A power supply to the sound producing part J is controlled by a transistor $Tr_3$, of which base electrode is connected to the output terminal of the oscillation circuit K (namely the output terminal of the NAND gate $N_4$) through a resistor. The terminal T is connected to the movable contact e of the selection switch 19. The output terminal of the NAND gate $N_3$ is connected to one of the input terminals of the NAND gate $N_4$. A resistor $R_6$ is connected across the input and output terminals of the NAND gate $N_3$. And a capacitor $C_2$ is connected across the output terminal of the NAND gate $N_4$ and the input terminal of the NAND gate $N_3$. The collector of the transistor $Tr_3$ is connected to the intermediate terminal T'.

When the movable contact e' of the selection switch 19 of FIG. 1 connects to stationary contact c' and the transistor 14 is in the ON state, the electric power source 1 is connected to the electrodes S and T through the transistor 14 and the selection switch 19. Then the oscillating circuit oscillates at the period determined by the time constant of the resistor $R_6$ and the capacitor $C_2$, and the transistor $Tr_3$ turns on and off by the oscillation. At the ON state of the transistor $Tr_3$, the electric power is supplied between the electrode S and T', and at the off state it is not supplied.

Therefore, the sound producing part J produces sound when the transistor $Tr_3$ is on and does not produce the sound when it is off. Namely an intermittent sound is produced from the sound producing part J corresponding to the conductive or non-conductive state of the transistor $Tr_3$.

The embodiment of the alarm sound producing circuit 20 illustrated in FIG. 3 produces the sound from the sound producing part J in an intermittent manner controlled by an oscillation of the oscillation circuit K in feeding the power source.

(4) Auditory indicating state of automatic flash completion (when switches 2 and 19 are on contacts d and d')

Finally, it is mentioned below that the operation when the movable contact e of the power switch 2 is changed so as to contact the stationary contact d. Also at this state, similarly as the operation of the last two cases, the main capacitor 4 is charged by a current from the electric power source 1 through the DC-DC converter 3. After a reaching to the predetermined charged voltage of the main capacitor 4, the zener diode 13 and the transistor 14 turn ON, and the LED 15 illuminates and indicates the reaching of the main capacitor 4. On that state, when the synchronous switch 5a is closed, the same operation described regarding to the abovementioned two cases (2) and (3) takes place. Namely well known automatic flashing and the indication operation for readiness of the automatic flashing by illumination of the LED 16 is accomplished. Furthermore, since the alarm sound producing circuit 20 is connected to the electric power source through the transistor 17 and the power switch 2, the alarm sound producing circuit 20 operates and produces sound, simultaneous with illumination of the LED 16 which is actuated by the operation of the timer circuit 18 and consequent conduction of the transistor 17.

Namely, by switching the movable contact e of the power switch 2 to the stationary contact d, it is possible to make the readiness indication for the automatic flashing by eyesight of the illumination of the LED 16 and by audition of the alarm sound producing circuit.

The belowmentioned table 1 is an operation table for the embodiment of FIG. 1, summing up the relation between the indications for the charging of the main capacitor 4 and for readiness of the automatic flashing and the positions of the power switch 2 and the selection switch 19, of the embodiment of FIG. 1.

TABLE 1

| contact of power switch 2 | contact of switch 19 | power feeding | Ready for flashing | | Indication of a completion of automatic flashing | |
|---|---|---|---|---|---|---|
| | | | LED 15 | alarm sound producing circuit 20 | LED 16 | alarm sound producing circuit 20 |
| a | a' | OFF | x | x | x | x |
| b | b' | ON | o | x | o | x |
| c | c' | ON | o | o | o | x |
| d | d' | ON | o | x | o | o |

In the table 1, the mark "o" shows an illumination state of the LEDs 15 and 16, or a sound producing state of the alarm sound producing circuit 20, and the mark "x" shows an extinguishing state of the LEDs 15 and 16, or a nonproducing state of the alarm sound producing circuit 20.

As explained referring to the description of FIG. 1 and the table 1, operating states of the operation indicator for automatic flash device of the present invention can be divide into four states and these states can be selected by the control of the power supply to change the four contacts of the power switch 2.

In the abovementioned embodiment, the automatic flash device is of a series type which have the thyristor 7 in series to the flash discharge tube 6. But, the present invention can be of couse applicable to a parallel type automatic flash device wherein a thryistor is connected in parallel to a flash discharge tube. In such parallel type device also, the timer circuit 18 is operated by the signal from a light receiving part, which controlls the operation of a trigger circuit for a by-pass device of a flash discharge device. Furthermore, as a modification, the selection switch 19 which controlls the connection of the alarm sound producing circuit 20 can be provided to be independent from the power switch 2. In such modified case, the number of the stationary contacts of the selection switch 19 can be decreased to three and that of the power switch 2 to two.

As has been described above, the present invention provides an operation indicator capable of indicating the charged voltage of the main capacitor and a completion of automatic flashing by eyesight and audition as the user desires.

What we claim is:

1. An automatic flash device having an operation indicator for indicating charging of a main capacitor to at least a predetermined voltage level to obtain discharge voltage for an automatic flash operation and proper completion of said automatic flash operation, wherein a flash discharging time period is controlled by light reflected by an object and received by a photoelectric device, comprising:
    a DC power source connected to respective positive and negative lower voltage lines,
    a DC-DC converter connected by input terminals across said positive and negative lower voltage lines and by output terminals to respective positive and negative higher voltage lines,
    a main capacitor connected across said positive and negative higher voltage lines,
    a flash discharging tube,
    a thyristor for controlling current feeding to said flash discharging tube from said positive and negative higher voltage lines,
    a trigger circuit for triggering discharge of said flash discharge tube and said thyristor simultaneously,
    a turn-off circuit for turning off and thryistor in response to a predetermined quantity of reflected light,
    a first series connection branch, including a first light emitting device and a first switching device, connected across said positive and negative lower voltage lines,
    a second series connection branch, including a second light emitting device and a second switching device, connected across said positive and negative lower voltage lines,
    a voltage detection means for detecting that the voltage across said positive and negative higher voltage lines has reached at least said predetermined voltage level, said first switching device being controlled in accordance therewith,
    a timer circuit for rendering said second switching device conductive for a predetermined time period in response to a signal derived from an output of said photoelectric device,
    an alarm sound producing means for producing alarm sound when current flow therethrough is provided for by the occurrence of one of two conditions, said conditions being the actuation of said first switching device by said voltage detection means and the actuation of said second switching device by said timer circuit, and
    selection switch means, which is linked to a power switch for common manual operation therewith, the power source and said alarm sound producing means thereby being switched with a common knob, for switching said alarm sound producing means between at least two connections, said connections being to said first switching device and to said second switching device, the charging of said main capacitor and the proper completion of said automatic flash operation thereby being indicated visually and selectively indicated sonicly according to the setting of said selection switch means.

2. In an automatic flash device having an operation indicator for indicating charging of a main capacitor to at least a predetermined voltage level to obtain discharge voltage for an automatic flash operation and proper completion of automatic flash operation, wherein a flash discharging time period is controlled by light reflected by an object and received by a photoelectric device, said automatic flash device including:
    a DC power source connected to respective positive and negative lower voltage lines,
    a DC-DC converter connected by input terminals across said positive and negative lower voltage lines and by output terminals to respective positive and negative higher voltage lines,
    a main capacitor connected across said positive and negative higher voltage lines,
    a flash discharging tube,
    a thyristor for controlling current feeding to said flash discharging tube, said flash discharging tube and said thyristor being connected in series across said positive and negative higher voltage lines,
    a trigger circuit for triggering discharge of said flash discharge tube and said thyristor simultaneously,
    a turn-off circuit for turning off said thyristor in response to a predetermined quantity of reflected light,
    the improvement being an operation indicator comprising:
    a first series connection branch, including a first light emitting device and a first switching device, connected across said positive and negative lower voltage lines,
    a second series connection branch, including a second light emitting device and a second switching device, connected across said positive and negative lower voltage lines,
    a voltage detection means for detecting that the voltage across said positive and negative higher voltage lines is at lease equal to said predetermined voltage level, said first switching device being controlled in accordance therewith,
    a timer circuit for rendering said second switching device conductive for a predetermined time period in response to a control signal corresponding to a predetermined quantity of reflected light,
    an alarm sound producing means for producing alarm sound when current flow therethrough is provided for by the occurrence of one of two conditions, said conditions being the actuation of said first switching device by said voltage detection means and the actuation of said second switching device by said timer circuit, and selection switch means, which is linked to a power switch for common manual operation therewith, a power source and said alarm sound producing means thereby being switched with a common knob, for switching said alarm sound producing means between at least two connections, said connections being to said first switching device and to said second switching device, the charging of said main capacitor and the proper completion of said automatic flash operation thereby being indicated visually and selectively indicated sonicly according to the setting of said selection switch means.

3. An apparatus according to claim 1 or 2, wherein said first and second light emitting devices are light emitting diodes.

4. An apparatus according to claim 1 or 2, wherein said first and second switching devices are transistors.

5. An apparatus according to claim 1 or 2, wherein said voltage detection means includes a zener diode for becoming conductive and thereby turning ON said first switching device when a voltage of said main capacitor is at least equal to said predetermined voltage level.

6. The apparatus as in claim 1 or 2, wherein said switch means further provides for switching said alarm sound producing means between a third connection, said third connection being for rendering said alarm sound producing means inoperative without affecting the visual indication of the charging of said main capacitor and the proper completion of said automatic flash operation.

* * * * *